Sept. 5, 1939.  T. H. NYE  2,171,887
SHAFT BEARING
Filed April 22, 1937  2 Sheets-Sheet 1

Inventor
THEODORE H. NYE

By Harold W. Eaton
Attorney

Sept. 5, 1939.　　　T. H. NYE　　　2,171,887
SHAFT BEARING
Filed April 22, 1937　　　2 Sheets-Sheet 2
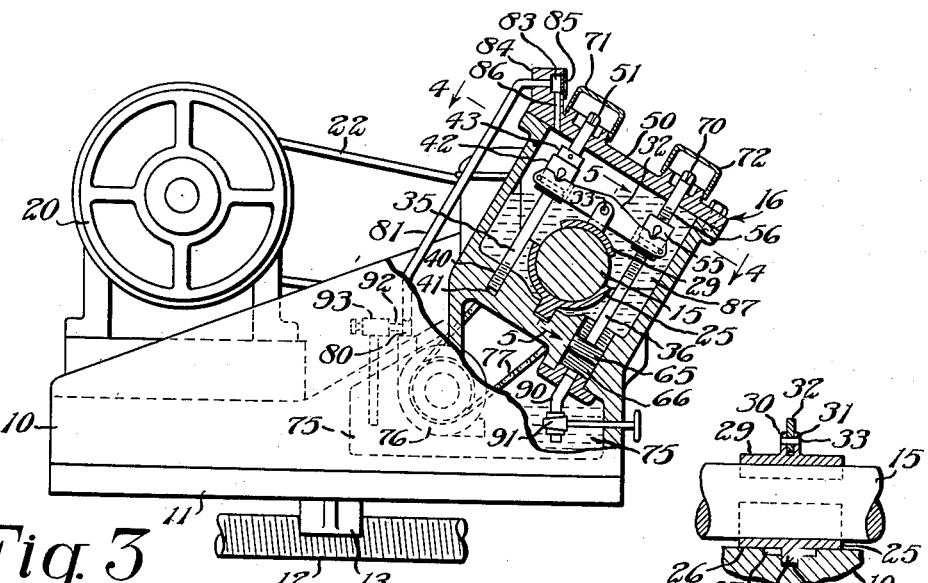
Inventor
THEODORE H. NYE
By Harold W. Eaton
Attorney Patented Sept. 5, 1939

2,171,887

UNITED STATES PATENT OFFICE 2,171,887

SHAFT BEARING

Theodore H. Nye, Worcester, Mass., assignor to Norton Company, Worcester, Mass., a corporation of Massachusetts Application April 22, 1937, Serial No. 138,411

10 Claims. (Cl. 308—65)

This invention relates to bearings, and more particularly to a shaft or spindle bearing of the adjustable type, such as are used in machine tools and the like where the maintenance of a close running fit is essential.

One object of the invention is to provide a simple and thoroughly practical adjustable bearing construction. Another object of the invention is to provide a bearing construction capable of long, continued and dependable operation. A further object of the invention is to provide an adjustable shaft or spindle bearing without the sacrifice of compactness of construction or dependability or simplicity of operation and action. A further object of the invention is to provide an improved shaft or spindle bearing construction in which a heat responsive means is provided for automatically adjusting the bearings to compensate for changes in temperature thereof. A further object of the invention is to provide an adjustable shaft or spindle bearing in which the adjustment of the bearing parts is automatically and thermostatically controlled. A further object of the invention is to provide an adjustable shaft or spindle bearing in which a heat sensitive means is provided for automatically controlling the adjustment of the bearing, so as to maintain a constant film of lubricant between the spindle and bearing regardless of variations in the temperature of the shaft.

A further object of the invention is to provide an automatic thermostatic means to maintain a selected clearance between a rotatable shaft and its bearings at all temperatures. Another object of the invention is to provide a manually adjustable means to establish a selected clearance between a shaft and its bearing, and independent manually adjustable thermostatic means automatically to maintain the selected clearance at all temperatures.

A further object of the invention is to provide an improved shaft or spindle bearing in which a manual means is provided for adjusting the bearing to establish an initial clearance between the bearing and shaft or spindle and in which a heat sensitive means is provided which is adapted to maintain the bearing in adjusted position and said oil film substantially constant regardless of variations in temperature of the lubricant, shaft and bearing parts.

Another object of the invention is to provide an automatic thermostatic adjustment and a bearing whereby the bearing is automatically adjusted to compensate for changes in the viscosity of the lubricant due to temperature changes. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings, in which is shown one of various possible embodiments of the mechanical features of this invention:

Fig. 2 is a plan view of a grinding machine wheel slide embodying this invention;

Fig. 3 is a combined end elevation and section, taken approximately on the line 3—3 of Fig. 2;

Fig. 4 is a fragmentary cross sectional view, taken approximately on the line 4—4 of Fig. 3; and Fig. 5 is a fragmentary longitudinal section, taken approximately on the line 5—5 of Fig. 3.

Figure 1:
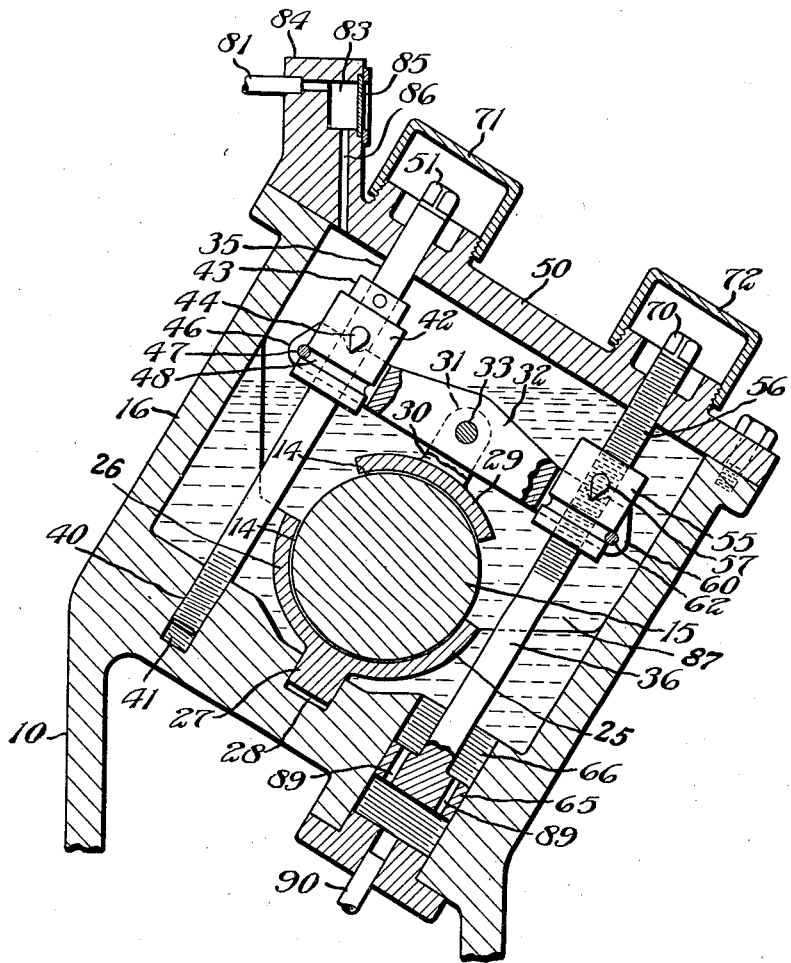
Fig. 1 is an enlarged cross sectional view through the improved bearing.

This invention relating to an improved bearing and lubricating system for shaft or spindle bearings, is applicable to any vertical, horizontal, or angularly positioned radial or journal bearings for rotatably supporting a shaft or spindle, such as in a machine tool, where it is necessary to provide a bearing having a fine adjustment to allow free rotation of the shaft or spindle with a proper clearance between the rotatable shaft and bearing part to maintain the desired oil film therebetween. As illustrated in the drawings, the improved bearing construction and lubricating system has been shown as applied to a machine tool, such as a wheel spindle support for a grinding wheel. A grinding machine wheel slide 10 has been illustrated in the drawings which is arranged to be moved transversely on ways 11 by means of a feed screw 12 and a half nut 13. The wheel slide 10 rotatably supports a wheel spindle 15 within a pair of spaced bearings which are contained within the projecting housings 16 and 17 projecting upwardly and forwardly from the main portion of the wheel slide 10. A grinding wheel 18 is mounted on one end of the wheel spindle 15. The wheel spindle 15 may be driven by any suitable means, such as for example an electric motor 20 mounted on the wheel slide 10. The motor 20 is provided with a driving pulley 21 which is connected by multiple V-belts 22 with a pulley 23 mounted on the other end of the wheel spindle 15.

The bearings for the shaft or spindle 15 are formed as a multi-part bearing in which a plurality of spaced members are arranged around the shaft or spindle, and in which at least one of said bearing members is supported in relatively fixed position on the slide 10 and at least one of said bearing parts are adjustable toward and from the spindle. The adjustable bearing part and/or parts are arranged for adjustment relatively toward and from the shaft and fixed bearing part in order that the initial clearance between the bearing parts and the shaft may be adjusted as desired to permit the shaft or spindle 15 to rotate on an oil film 14 of the desired thickness. The movable bearing parts or members are provided with a further automatic adjustment which comprises a thermostatic or heat sensitive means whereby the adjustable bearing part or parts may be maintained in adjusted position with the selective initial clearance between the bearing parts and the spindle to maintain an oil film 14 of a substantially constant thickness between the shaft and bearing parts at any temperature thereof.

In the preferred form, as illustrated in the drawings, a lower half bearing 25 is mounted in a semi-cylindrical grooved surface 26 in the wheel slide 10. The lower bearing member or part 25 is provided with a downwardly extending boss 27 which slidably fits within an aperture 28 in the wheel slide 10 to locate the lower bearing member longitudinally and circumferentially. A movable or adjustable bearing member 29 having a partial cylindrical bearing surface thereon is arranged to engage the upper surface of the shaft or spindle 15 in a position substantially opposite to the lower bearing member 25. As illustrated in the drawings, the upper or adjustable bearing member 29 is provided with a pair of upwardly extending lugs 30 and 31 by which the bearing member 29 is pivotally connected to a cross head 32 by means of a stud 33.

To adjust the bearing member 29 relatively towards and from the lower bearing part 25 and shaft 15, two spaced rods 35 and 36 are arranged on opposite sides of the shaft or spindle 15 and the bearing members 25 and 29. The rods 35 and 36 are preferably of a heat sensitive material and are arranged so as to automatically and thermostatically control the position of the upper adjustable bearing member 29 during any changes in temperature of the spindle 15 and the bearing parts 25 and 29.

It must be recognized that a spindle will average through its full section materially hotter than its bearing or the surrounding lubricant. Hence, the rods heated by the surrounding lubricant will be considerably cooler than the shaft or spindle 15. In order to maintain equal expansion of the spindle 15 and the rods 35 and 36, it requires one or both of two conditions, first the effective length of the two rods must be greater than the shaft or spindle diameter, or the rod material must have a coefficient of expansion enough greater than that of the shaft or spindle to make the balance required. A combination of the two is disclosed in the drawings in which both rods are longer than the diameter of the spindle 15 and both have a relatively high coefficient of expansion, for example being made of brass. Other material having a still higher coefficient of expansion may be used, if desired.

The rod 35 is provided with a threaded portion 40 which is screw threaded in a hole 41 in the wheel slide 10. A sleeve 42 surrounds the rod 35 which is free to rotate therewithin. A collar 43 which is pinned to the rod 35 serves to prevent upward movement of the sleeve 42. The sleeve 42 is provided with diametrically opposed knife edge members 44 and 45 which engage the opposite arms of a yoked portion 46 formed on one end of the cross head member 32, thus forming a pivotal connection between the rod 35 and the cross head member 32. The outer end of the yoked member 46 is connected together by means of a pin 47 which passes through the opposite arms of the yoked member to hold said arms in a fixed position relative to each other. A groove 48 is cut in the sleeve 42 and serves with the pin 47 to locate the sleeve 42 relative to the cross head member 32, but allows free motion thereof in a lateral direction. The rod 35 extends upwardly through a cover plate 50 fastened on the top of the wheel slide casing, and is provided with a squared-off portion 51 by means of which a wrench may be readily applied to rotate the rod 35 and thereby to vary its effective length in adjusting or setting up the bearing.

The other rod 36 is mounted in a similar manner, that is with its lower end screw threaded into a portion of the wheel slide casting. A sleeve 55 is screw threaded onto a threaded portion 56 on the upper end of the rod 36. The sleeve 55 is provided with two diametrically opposed knife edge projections 57 and 58 (Fig. 4) which engage the arms 59 and 60 of a yoked portion 61 at the other end of the cross head member 32. The outer end of the arms 59 and 60 are connected together by means of a pin 62 which is threaded in said arms or riveted thereto to hold the arms of the yoked member in a definite relationship with each other. The sleeve 55 is similarly provided with a groove on its outer periphery adjacent to its lower end which engages the pin 62 to locate and hold the bushing in a definite relationship with the cross head member 32.

The lower end of the rod 36 is provided with an enlarged head 65 which is screw threaded into an aperture 66 in the wheel slide casting. The head 65 is provided with a screw thread on its periphery which is of the same pitch as the thread adjacent to the upper end of the rod 36. The threaded head 65 is screw threaded into a correspindingly screw threaded aperture 66 in the wheel slide 10. The rod 36 projects upwardly through the cover plate 50 and is provided with a squared portion 70 by means of which the operator by the use of a wrench may adjust the rod 36 as desired. It will be readily appreciated from this construction that by a rotary adjustment of the rod 36, the effective length of the thermostatic or heat sensitive rod 36 may be varied as desired. Due to the fact that the threaded portions 56 and 65 on the rod 36 are of the same pitch, the length of the rod 36 may be adjusted as desired without disturbing the initial selective clearance adjustment established by adjustment of the thermostatic or heat sensitive rod 35. Enclosure caps 71 and 72 are provided to enclose the squared heads 51 and 70, respectively, of the rods 35 and 36.

By varying the effective length of the thermostatic or heat sensitive rod 36, it is possible to adjust the parts so as to vary the thickness of the oil or lubricant film between the bearing members and the shaft in inverse ratio to the temperature of the lubricant. The viscosity of the lubricant or oil changes due to temperature changes, that is the oil thins out as it becomes heated, thus thinning down the oil film between the bearings and the shaft and making it desirable to provide this adjustment to compensate therefor.

In order properly to lubricate the spindle 15 and the bearing parts 25 and 29, a suitable lubricating system is provided which preferably comprises a self-contained system located within the wheel slide, including a reservoir 75 within the slide 10. A pump 76 is located within the reservoir 75 and is driven by means of a link chain 77 by a sprocket (not shown) mounted on the wheel spindle 15. The pump 76 conveys fluid under pressure through a pipe 80 which extends vertically above the pump and then separates into the pipes 81 and 82, each of which conveys a lubricant to the bearings contained within the casings 16 and 17, respectively. The fluid passing through the pipes 80 and 81 enters chambers 83 within upwardly projecting bosses 84 on the wheel slide. A bull's-eye or window 85 in the front of the chamber 83 makes it possible for the operator readily to observe the flow of oil through said chamber. Lubricant from the chamber 83 passes through a passage 86 into the chamber 87 which surrounds the shaft 15, the bearing members 25 and 29, and also the effective thermostatic or heat sensitive portions of the rods 35 and 36 and passes outwardly through holes 89 in the enlarged head 65 of the rod 36. The lubricant passing through the holes 89 then passes through a pipe 90 and a manually controlled valve 91 into the reservoir 75. The holes 89 through the head 65 have a combined cross sectional area equal to or greater than the cross sectional area of the pipe 90, thus allowing unrestricted passage of lubricant from the chamber 87 through the pipe 90 into the reservoir.

By adjustment of the valve 91, the exhaust or drainage of lubricant from the chamber 87 may be varied as desired to maintain the desired lubricant level within the chamber 87. It should be noted that the chamber 87 completely surrounds the lower fixed part 25 of the bearing with the exception of the stud portion 27, so that any changes in temperature of the shaft 15, lower fixed bearing part 25 or upper adjustable part 29 are conducted to the lubricant within the chamber 87. The lubricant within the chamber 87 surrounds both of the effective portions of the thermostatic or heat sensitive rods 35 and 36 so that as the temperature of the oil or lubricant within the chamber 87 increases due to heat transferred from the shaft and bearing parts, the rods 35 and 36 will be caused to expand by an amount sufficient to maintain the selected clearance between the shaft and bearing parts at all temperatures thereof. The pipe line 80 is provided with a by-pass pipe 92 and a relief valve 93 by which any excess fluid from the pump may be returned directly to the reservoir 75. By adjustment of the relief valve 93 and the exhaust or return control valve 91, the desired amount of lubricant may be retained within the opening 87.

The operation of this improved bearing and lubricating construction will be readily apparent from the foregoing disclosure. The rod 35 is first adjusted manually so as to provide the desired selected clearance between the shaft and its bearings and the rod 36 is then adjusted to provide the proper effective length between the enlarged head 65 and the sleeve 55 so that when the spindle or shaft 15 and the bearing parts 25 and 29 together with the lubricant within the chamber 87 heat up, the increase in temperature of the lubricant caused by an increase in temperature of the shaft and bearing parts causes the rods 35 and 36 to expand with the expansion of the shaft 15 and bearing parts 25 and 29, so as to maintain a selected clearance between the shaft and bearing parts during the entire range of running temperatures. By utilizing this invention in a grinding wheel spindle and bearing construction, it is possible to provide a suitable selected clearance between the bearing and parts so that the rotation of the shaft or spindle may be started and the grinding operation started as soon as the rotation of the spindle 15 has started, thus eliminating the necessity of waiting until the spindle, bearing parts and lubricant have heated up to a running temperature before a grinding operation can be initiated.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. A journal bearing having two parts, one part being fixed and the other part being movable toward and away from the fixed part, a rotatable spindle supported therebetween, a lubricating system to convey a lubricant to said bearing and bearing parts and spindle, a lubricant chamber surrounding said spindle and bearing parts, and thermostatically controlled means immersed in lubricant within said chamber which is responsive to the temperature of said lubricant to maintain said movable part in a predetermined position with respect to said spindle.

2. A journal bearing comprising two or more bearing parts, at least one of said parts being fixed and at least one of said parts being movable toward and away from the fixed part, a rotatable shaft supported by said bearing part, a lubricating system including means to convey lubricant to said shaft and bearings, means to adjust said movable bearing part, a lubricant chamber surrounding said shaft and bearing parts, and heat responsive means immersed in lubricant within said chamber for controlling the movable bearing part and maintaining a substantially constant oil film in response to changes in temperature of the lubricant within and surrounding said bearings.

3. A journal bearing comprising a plurality of separated bearing parts, at least one of said parts being fixed and at least one of said bearing parts being movable toward and away from said fixed part, a rotatable shaft journaled therein, a lubricating system which is arranged to convey a lubricant to said shaft and bearings, a lubricant chamber surrounding said shaft and bearing parts, and a heat sensitive means immersed in lubricant within said chamber for controlling the position of the movable bearing parts, whereby to maintain a constant film of lubricant between the spindle and bearings regardless of variations in temperature of the bearing parts and lubricant.

4. A journal bearing composed of two or more parts, at least one of said bearing parts being fixed and at least one of said bearing parts being movable toward and away from said fixed bearing part, a rotatable shaft journaled therein, a lubricating system to convey a lubricant to said bearings, said bearing parts and shaft, adjustable means for controlling the position of said movable bearing part, a lubricant chamber surrounding said shaft and bearing parts, and heat responsive means immersed in lubricant within said chamber for automatically adjusting said movable bearing member in response to changes or variations in the temperature of said lubricant.

5. A journal bearing having a frame, a bearing member on said frame, a rotatable shaft supported on said bearing, an adjustable bearing member opposed to said first bearing member, means to convey lubricant to said shaft and bearing to provide a lubricant film between the shaft and bearing members, a lubricant chamber surrounding said shaft and bearing members, and automatic thermostatic means within said lubricant chamber to vary the thickness of said lubricant film in inverse ratio to changes in temperature of said lubricant.

6. A journal bearing and lubricating system therefor having a frame, a bearing member on said frame, a rotatable shaft supported thereon, an adjustable bearing member on the opposite side of said shaft from the first bearing member, means to convey lubricant to said shaft and bearing members, a lubricant chamber surrounding said shaft and bearing, and a thermostatic means including a heat sensitive member which is immersed in lubricant within said chamber automatically to adjust and hold said adjustable bearing so as to provide a selected initial clearance between the bearing parts and shaft at any temperature.

7. A bearing and lubricating system having a frame, a bearing member on said frame, a rotatable shaft supported thereon, an adjustable bearing member arranged on the opposite side of the shaft from the first bearing member, a lubricating system which is arranged to convey lubricant to said bearing and shaft, a lubricant chamber surrounding said bearing member and shaft, and a thermostatic means including a heat sensitive member within said chamber which is arranged automatically to adjust and hold said adjustable bearing member so as to maintain a selected oil film between the bearing parts and shaft at any temperature.

8. A journal bearing having a frame, a half bearing on said frame, a rotatable shaft supported thereon, a bearing shoe opposed to said half bearing, a cross head member carried by said shoe, a pair of heat sensitive rods arranged on opposite sides of said shaft and bearings, said shaft and bearing parts and heat sensitive rods being immersed in lubricant within a lubricant chamber, means manually to adjust said rods to provide an initial clearance between the bearing parts and spindle, and means independent of said lubricant to vary the effective length of one of said rods so as automatically to maintain said initial clearance at any temperature of said bearing and shaft.

9. A journal bearing having a frame, a bearing member supported on said frame, a rotatable shaft supported on said bearing member, a second bearing member arranged on the opposite side of the shaft from the first bearing member, a cross head member carried by said second bearing member and arranged to adjust the same, heat sensitive rods arranged on opposite sides of said shaft and adjustably connecting the cross head member to said frame, a lubricant chamber surrounding said shaft and bearing members and heat sensitive rods, means manually to adjust said heat sensitive rods to provide a selected initial clearance between the bearing parts and shaft, and independent means for varying the effective portion of said heat sensitive means so as automatically to maintain said initial selected clearance at any temperature of said parts.

10. A journal bearing having a supporting frame, a bearing member located on said frame, a rotatable shaft supported on said bearing member, an adjustable bearing member arranged on the opposite side of said shaft from the first bearing member, a pair of heat sensitive rods on opposite sides of said shaft for adjustably connecting said adjustable bearing member to said support, a lubricant chamber surrounding said shaft, bearing parts and heat sensitive rods, manually operable means to adjust said heat sensitive rods to provide an initial selected clearance between the bearing members and shaft to provide space for an oil film therebetween, and independent means for adjusting the effective capacity of said heat sensitive means automatically to maintain said initially selected clearance at any temperature of said shaft, bearing parts and lubricant so as to maintain the desired oil film between the shaft and bearing parts at all times.

THEODORE H. NYE.